United States Patent [19]

Liu

[11] 4,438,231

[45] Mar. 20, 1984

[54] HIGH IMPACT STRENGTH, FLAME RETARDANT POLYCARBONATE COMPOSITION

[75] Inventor: Ping Y. Liu, Naperville, Ill.

[73] Assignee: General Electric Company, Mt. Vernon, Ind.

[21] Appl. No.: 343,948

[22] Filed: Jan. 29, 1982

[51] Int. Cl.$^3$ .................. C08K 5/42; C08L 51/06; C08L 69/00

[52] U.S. Cl. ........................... 524/161; 524/162; 524/164; 524/508; 525/67; 525/146; 525/148

[58] Field of Search ............... 524/508, 161, 165, 164, 524/162; 525/67, 68, 146, 148, 147; 529/163

[56] References Cited

U.S. PATENT DOCUMENTS

| | | |
|---|---|---|
| 4,096,262 | 6/1978 | Farnham et al. |
| 4,197,232 | 4/1980 | Bialous et al. |
| 4,208,489 | 6/1980 | Schmidt et al. ............... 525/146 |
| 4,222,910 | 9/1980 | Tokuda ........................ 525/146 |
| 4,260,693 | 4/1981 | Liu. |
| 4,263,201 | 4/1981 | Mark et al. ................... 525/148 |
| 4,264,487 | 4/1981 | Fromuth et al. ............... 525/68 |

Primary Examiner—Allan Lieberman
Attorney, Agent, or Firm—Martin B. Barancik

[57] ABSTRACT

The compositions of the invention comprise from about 70 to 85 parts by weight of a high molecular weight polycarbonate resin, from about 10 to 30 parts by weight of a copolymer of tetrabromobisphenol-A and bisphenol-A, from about 1 to 5 parts by weight of a multiphase composite interpolymer of an acrylate and a methacrylate, from about 0.5 to 5 parts by weight of a copolymer of an olefin and acrylate and an effective amount of a flame retardant alkali metal salt.

11 Claims, No Drawings

HIGH IMPACT STRENGTH, FLAME RETARDANT POLYCARBONATE COMPOSITION

BACKGROUND OF THE INVENTION

Compositions of a polycarbonate resin, a multiphase composite acrylate copolymer sometimes referred to as a multiphase composite interpolymer comprising acrylate and methacrylate and an olefin-acrylate have been used commercially as impact modified molding compositions. Great efforts have been made to find additives that will impart flame retardancy to this type of a polycarbonate composition while maintaining good impact strength. The applicant has found that if a specific amount of specific flame retardant additives are employed, a flame retardant composition of a polycarbonate, a multiphase composite acrylate copolymer and an olefin-acrylate will be obtained that possesses good impact strength. All of the compositions of the invention exhibit flame retardancy. If desired, the compositions may be prepared so that a rating of VO according to Underwriters Laboratories Bulletin 94 can be obtained.

DETAILED DESCRIPTION OF THE INVENTION

The compositions of the invention comprise:
(a) from about 70 to 85 parts by weight of a high molecular weight polycarbonate resin;
(b) from about 10 to 30 parts by weight of a copolycarbonate of tetrabromobisphenol-A and bisphenol-A;
(c) from about 1 to 5 parts by weight of a multi-phase composite interpolymer comprising an acrylate and a methacrylate;
(d) from about 0.5 to 5 parts by weight of a copolymer of an olefin and an acrylate; and
(e) an effective amount of a flame retardant alkali metal salt.

All parts by weight are per 100 parts of the sum of a, b, c, d and e.

The polycarbonate resin may be of the formula:

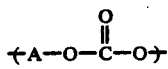

wherein A is a divalent aromatic radical. Preferred polycarbonate resins are of the formula:

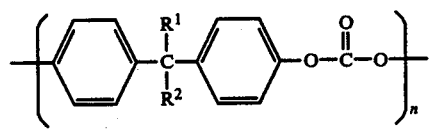

wherein $R^1$ and $R^2$ are hydrogen, (lower) alkyl or phenyl and n is at least 30 or preferably between 40 an 400. The term (lower) alkyl includes alkyl groups of from 1-6 carbon atoms.

High molecular weight, thermoplastic, aromatic polycarbonates in the sense of the present invention are to be understood as homopolycarbonates and copolycarbonates and mixtures thereof which have a number average molecular weight of about 8,000 to more than 200,000, preferably of about 19,000 to 80,000 and I.V. of 0.30 to 1.0 dl/g and preferably above 0.5 dl/g as measured in methylene chloride at 25° C. These polycarbonates are derived from dihydric phenols such as, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-(3,5,3'5'-tetrachloro-4,4'-dihydroxyphenyl)propane, 2,2-(3,5,3'5'-tetetrabromo-4-4'-dihydroxydiphenyl)propane and (3,3'-dichloro-4,4'-dihydroxyphenyl)methane. Other dihydric phenols which are also suitable for use in the preparation of the above polycarbonates are disclosed in U.S. Pat. Nos. 2,999,835; 3,028,365; 3,334,154 and 4,131,575.

These aromatic polycarbonates can be manufactured by known processes, such as, for example, by reacting a dihydric phenol with a carbonate precursor such as phosgene in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

The aromatic polycarbonates utilized in the present invention also include the polymeric derivatives of a dihydric phenol, a dicarboxylic acid, and carbonic acid such as disclosed in U.S. Pat. No. 3,169,121.

It is also possible to employ two or more different dihydric phenols or a copolymer of a dihydric phenol with a glycol or acid terminated polyester, or with a dibasic acid in the event a carbonate copolymer or interpolymer rather than a homopolymer is desired for use in the preparation of the aromatic polycarbonate utilized in the practice of this invention. Also employed in the practice of this invention can be blends of any of the above materials to provide the aromatic polycarbonate.

Branched polycarbonates, such as are described in U.S. Pat. No. 4,001,184, can be utilized in the practice of this invention, as can blends of a linear polycarbonate and a branched polycarbonate.

The multiphase composite interpolymers which comprise a $C_{1-5}$ acrylate and a $C_{1-5}$ methacrylate are described in U.S. Pat. No. 4,260,693 and in U.S. Pat. No. 4,096,202, both of which are incorporated by reference. These interpolymers consist of about 25 to 95 weight percent of a first elastomeric phase polymerized from a monomer system comprising about 75 to 99.8 percent by weight of a $C_{1-5}$ alkyl acrylate, 0.1 to 5 percent by weight crosslinking monomer, and 0.1 to 5 percent by weight of graftlinking monomer, and about 75 to 5 weight percent of a final rigid thermoplastic phase polymerized in the presence of said elastomeric phase.

The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate.

The graftlinking monomer is a polyethylenically unsaturated monomer having a plurality of addition poly merizable reactive groups, at least one of which polymerizing at substantially different rates of polymerization from at least one other of said reactive groups. The function of the graftlinking monomer is to provide a residual level of unsaturation in the elastomeric phase, particularly in the latter stages of polymerization and consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer. Among the effective graftlinking monomers are alkyl group-containing monomers of alkyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methyacrylate.

The copolymer of an olefin and an acrylate is a copolymer of a $C_{2-5}$ olefin and a $C_{1-5}$ acrylate that may be employed in the practice of the invention is a copolymer of an olefin such as ethylene, propylene, isobutylene, pentene and the like. The $C_{2-5}$ acrylate may be an acrylate such as ethyl acrylate; n-butyl acrylate; 1,3-butylene diacrylate; methyl acrylate; 1,4-butanediol diacrylate and isobutyl acrylate.

The acrylate portion of the olefin-acrylate copolymer based on the total weight of the copolymer, can range from about 10 to about 30 weight percent. The olefin portion can range from about 70 to about 90 weight percent. The preferred olefin-acrylate copolymer is an ethylene-ethyl acrylate copolymer, in which the weight ratio of the ethylene fraction to the ethyl acrylate fraction is about 4.5 to 1. These olefin acrylate copolymers are commercially available or may be prepared by methods that are well known to those who are skilled in the art.

The composition may contain from 0.005 to 0.5 parts by weight per 100 parts by weight of composition of polytetrafluoroethylene to act as a drip inhibitor to prevent the formation of flaming droplets.

The flame retardant alkali metal salts which can be used are those salts known to be effective material for polycarbonate. Examples of such salts include sodium 2,4,5-trichlorobenzene sulfonate; potassium diphenyl sulfonate; the alkali metal perfluoroalkyl sulfonates such as sodium perfluorooctylsulfonate and potassium perfluorobutyl sulfonate. Flame retardant amounts may be selected from the range of from about 0.1 to 0.75 parts by weight per 100 parts of the sum of a, b, c, d and e and the exact amount will be determined by the degree of flame retardancy that is required.

The copolycarbonates of tetrabromobishpenol-A and bisphenol-A are well known and these copolymers may be prepared by conventional techniques. A preferred copolymer is a 50:50 by weight copolymer having an I.V. of about 0.37 dl/g as measured in methylene chloride at 25° C.

The compositions of the invention may include reinforcing fillers, such as aluminum, iron or nickel and the like and nonmetals, such as carbon filaments, silicates, such as acicular calcium silicate, acicular calcium sulfate, wollastonite, asbestos, titanium dioxide, potassium titanate, bentonite, kaolinite and titanate whiskers, glass flakes and fibers and mixtures thereof. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the reinforcing filler may comprise from about 1 to about 60 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for reinforcement are made by mechanical pulling. The filament diameters range from about 0.003 to 0.009 inch, but this is not critical to the present invention.

By glass fibers, it is understood that glass silk, as well as all glass fiber materials derived therefrom including glass fiber fabrics, rovings, stable fibers and glass fiber mats are included. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about ⅛" to about 1" long, preferably less than ¼" in length. These are called chopped strands. Some of these binding agents are polymers such as polyvinyl acetate, particular polyester resins, polycarbonates, starch, acrylic, melamine or polyvinyl alcohol. Preferably, the composition contains from about 1 to about 50 weight percent of the glass fibers.

Other conventional non-reinforcing fillers, antioxidants, extrusion aids, light stabilizers, foaming agents such as those disclosed in U.S. Pat. No. 4,263,409 and Ger. Offen. No. 2,400,086, which are incorporated by reference and the like may be added to the composition of the invention if desired.

The manner of preparing the inventive composition, is conventional. Preferably, each ingredient is added as part of a blend premix and the latter is mixed, e.g. by passage through an extuder, or by fluxing on a mill at a temperature dependent on the particular composition. The mixed composition may be cooled and cut up into molding granules and molded into the desired shape.

DESCRIPTION OF THE PREFERRED EMBODIMENTS

The following examples illustrate the invention. All parts are by weight.

EXAMPLE 1

A 1500.0 g molding composition was prepared using 76.55 parts by weight of a polycarbonate of 2,2-bis-(4- hydroxyphenyl)propane having an I.V. of about 0.53 dl/g as measured in methylene chloride at 30° C.; 19.14 parts by weight of a 50:50 copolycarbonate of tetrabromobisphenol-A and bisphenol-A having an I.V. of about 0.33 dl/g as measured in methylene chloride at 30° C.; 2.87 parts by weight of a multiphase interpolymer comprising a weight ratio of about 4 to 1 of n-butyl acrylate to methyl methacrylate[1]; 0.96 parts by weight of a copolymer of ethylene and ethyl acrylate[2]; 0.01 parts by weight of polygtetrafluoroethylene; and 0.48 parts by weight of sodium 2,4,5-trichlorobenzene sulfonate by mechanically mixing the ingredients in a tumbler and thereafter extruding and pelletizing the composition. Test bars were molded at 265° C. and were found to have the following properties. The term double gate is used to refer to the preparation of a molded sample in a mold having two entry ports that result in a weld line at the junction of the fluid resin in the mold during the molding cycle. The design, preparation of the molded part, and testing of the following examples are according to ASTM D256. Izod impact strengths are reported as ft.lb/in. of notch. Double gate values are reported in ft. lb. The superscripts indicate the percentage of ductility. UL 94 refers to the Underwriter Laboratory test system employed for assessing flammability of the polycarbonate composition.

[1]Acryloid KM 330, Rohm & Haas, Philadelphia, PA. [2]Bakelite DPD 6169, Union Carbide, Danbury, CT.

| SAMPLE | UL94 | NOTCHED IZOD ⅛" | NOTCHED IZOD ¼" | DG |
|---|---|---|---|---|
| A | VO | 15.3[100] | 10.3[100] | 38.8[100] |

EXAMPLE 2

A second composition was prepared according to the procedure of Example 1 which differed from Example 1 in that the 76.55 parts by weight of a polycarbonate of 2,2-bis-(4-hydroxyphenyl)propane had an I.V. of 0.46 dl/g as measured in methylene chloride at 30° C. Test bars of this composition had the following properties:

| SAMPLE | UL94 | NOTCHED IZOD ⅛" | NOTCHED IZOD ¼" | DG |
|---|---|---|---|---|
| B | V2 | 13.2[100] | 6.3[40] | 33.1[100] |

Although classified V2 under the UL test system, two of the five test bars were classified VO.

A comparison of Examples 1 and 2 shows that improved flame retardancy and impact strength can be obtained by using a high molecular weight aromatic polycarbonate resin with an I.V. of above about 0.5 dl/g as measured in methylene chloride at 25° C.

EXAMPLE 3

A 1500.0 g molding composition prepared from 66.98 parts by weight of a polycarbonate of 2,2-bis-(4-hydroxy phenyl)propane having an I.V. of 0.53 as measured in methylene chloride at 30° C.; 28.71 parts by weight of the 50:50 copolycarbonate of tetrabromobisphenol-A and bisphenol-A that was used in Example 1, 2.87 parts by weight of the multiphase composite interpolymer of Example 1; 0.96 parts by weight of the olefin acrylate copolymer of Example 1; 0.01 parts by weight of polytetrafluoroethylene; and 0.48 parts by weight of sodium 2,4,5-trichlorobenzene sulfonate using the same procedure that was employed in Example 1. Test bars were molded from this composition and were found to have a UL94 rating of VO and a DG of 28[60].

CONTROL EXAMPLE A

Compositions containing 95.45 parts by weight of a polycarbonate of 2,2-bis(4-hydroxyphenyl)propane having an I.V. about 0.46 dl/g as measured in methylene chloride at 30° C.; 3.0 parts by weight of the multiphase composite interpolymer of Example 1; 1.0 parts by weight of the olefin acrylate of Example 1; 0.3 parts by weight of pentaerythritol tetrastearate and 0.25 parts by weight of potassium diphenyl sulfonate were prepared according to the procedure of Example 1. Test bars were rated V2 in the UL94 test procedure.

| | UL94 | N. IZOD ⅛" | N. IZOD ¼" | DG |
|---|---|---|---|---|
| Control A | V2 | 14.4[100] | 11.4[100] | 38.7[100] |

CONTROL EXAMPLE B

Compositions containing 95.2 parts by weight of the polycarbonate of Control Example A; 3.0 parts by weight of the multiphase composite interpolymer of Control Example A; 1.0 parts by weight of the olefin-acrylate copolymer of Control Example A; 0.5 parts by weight sodium trichlorobenzoate and 0.3 parts by weight of pentaerythritol tetrastearate were prepared according to the procedure of Example 1. Test bars of this composition had a UL94 rating of HB.

| | UL94 | N. IZOD ⅛" | N. IZOD ¼" | DG |
|---|---|---|---|---|
| Control B | Burns | 14.4[100] | 9.6[100] | 39.3[100] |

The Examples show that the composition of the invention has flame retardancy and retains good impact strength while the control examples show that other flame retardants do not achieve these results.

Obviously, other variations are possible in light of the above teachings. It is therefore to be understood that changes may be made in the particular embodiments of the invention described which are within the full intended scope of the invention as defined by the appended claims.

What is claimed is:

1. A flame retardant molding composition which comprises:
    (a) from about 70 to 85 parts by weight of a high molecular weight polycarbonate resin;
    (b) from about 10 to 30 parts by weight of a copolycarbonate of tetrabromobisphenol-A and bisphenol-A;
    (c) from about 1 to 5 parts by weight of a multiphase composite interpolymer comprising an acrylate and a methacrylate;
    (d) from about 0.5 to 5 parts by weight of a copolymer of a $C_{2-5}$ olefin and a $C_{1-5}$ acrylate;
and
    (e) an effective amount of a flame retardant alkali metal salt.

2. A flame retardant molding composition as defined in claim 1 which includes from about 0.005 to 0.5 parts by weight of polytetrafluoroethylene per 100 parts of composition.

3. A flame retardant molding composition as defined in claim 2 wherein the polycarbonate resin is of the formula:

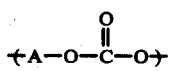

wherein A is a divalent aromatic radical.

4. A flame retardant molding composition as defined in claim 3 wherein the high molecular weight polycarbonate is of the formula:

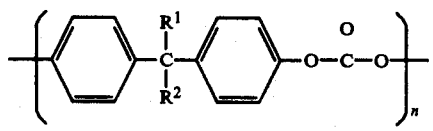

wherein $R^1$ and $R^2$ are hydrogen, (lower) alkyl or phenyl and n is at least 30.

5. A flame retardant molding composition as defined in claim 5 wherein the polycarbonate resin is derived from 2,2-bis(4-hydroxyphenyl)propane.

6. A flame retardant molding composition as defined in claim 6 wherein the multiphase composite interpolymer comprises methyl methacrylate and n-butyl acrylate.

7. A flame retardant molding composition as defined in claim 4 or 6 wherein the copolymer of a $C_{1-5}$ acrylate and $C_{2-5}$ olefin is a copolymer of an olefin selected from the group consisting of ethylene, propylene and isobutylene and the acrylate is selected from the group consisting of ethyl acrylate, n-butyl acrylate, 1,3-butylene diacrylate, isobutyl acrylate, 1,4-butanediol diacrylate.

8. A flame retardant molding composition as defined in claim 7 wherein the copolymer is an ethylene-ethyl acrylate copolymer.

9. A flame retardant molding composition as defined in claim 1 which includes a reinforcing amount of a reinforcing filler.

10. A flame retardant molding composition as defined in claim 9 wherein the reinforcing filler is filamentous glass.

11. A flame retardant molding composition exhibiting improved impact strength which comprises:
  (a) from about 70 to 85 parts by weight of a high molecular weight aromatic polycarbonate resin having a number average molecular weight of about 8,000 to more than 200,000 and an intrinsic viscosity (I.V.) of 0.30 to 1.0 dl/g as measured in methylene chloride at 25° C.
  (b) from about 10 to 30 parts by weight of a copolycarbonate of tetrabromobisphenol-A and bisphenol-A;
  (c) from about 1 to 5 parts by weight of a multiphase composite interpolymer comprising:
    (i) from about 25 to 95% by weight of a first elastomeric phase polymerized from a monomer system comprising about 75% to 99.8% by weight of a $C_1$-$C_5$ alkyl acrylate, 0.1 to 5% by weight of a crosslinking monomer, said crosslinking monomer being a polyethylenically unsaturated monomer having a plurality of addition polymerizable reactive groups all of which polymerize at substantially the same rate of reaction, and 0.1 to 5% by weight of a graftlinking monomer, said graftlinking monomer being a polyethylenically unsaturated monomer having a plurality of addition polymerizable reactive groups, at least one of which polymerizes at a substantially different rate of polymerization from at least one other of said reactive groups; and
    (ii) from about 75% to 5% by weight of a final rigid thermoplastic phase of a $C_1$-$C_5$ methacrylate, based upon the total weight of the overall multiphase composite interpolymer component (c);
  (d) from about 0.5 to 5 parts by weight of an olefin-acrylate copolymer, wherein the acrylate portion comprises from about 10 to about 30% by weight of a $C_1$-$C_5$ acrylate and the olefin portion comprises from about 70 to about 90% by weight of a $C_2$-$C_5$ olefin, based on the total weight of copolymer (d); and
  (e) from about 0.1 to 0.75 parts by weight of a flame retardant alkali metal salt of the type known to be effective for flame retarding polycarbonates.

* * * * *